US008321781B2

(12) United States Patent  
Tolle (10) Patent No.: US 8,321,781 B2
(45) Date of Patent: Nov. 27, 2012

(54) USER INTERFACE PANE FOR AN INTERACTIVE CHART

(75) Inventor: Kirstin M. Tolle, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 720 days.

(21) Appl. No.: 11/672,835

(22) Filed: Feb. 8, 2007

(65) Prior Publication Data

US 2008/0195930 A1   Aug. 14, 2008

(51) Int. Cl.  
*G06F 17/00* (2006.01)  
*G06F 3/048* (2006.01)

(52) U.S. Cl. ........................................ 715/227; 715/769

(58) Field of Classification Search ............... 715/227, 715/724, 764, 769, 780, 788, 810, 841, 859; 717/105; 705/1, 105; 345/1, 440  
See application file for complete search history.

(56) References Cited

U.S. PATENT DOCUMENTS

| 5,808,610 | A | * | 9/1998 | Benson et al. ............... 715/788 |
| 5,917,499 | A |   | 6/1999 | Jancke et al. ................ 345/440 |
| 6,064,401 | A |   | 5/2000 | Holzman et al. ............. 345/440 |
| 6,144,379 | A |   | 11/2000 | Bertram et al. ............. 345/348 |
| 6,320,586 | B1 |  | 11/2001 | Plattner et al. ............. 345/441 |
| 6,529,217 | B1 |  | 3/2003 | Maguire, III et al. ........ 345/769 |
| 6,667,743 | B2 |  | 12/2003 | Bertram et al. .............. 345/400 |
| 6,704,016 | B1 |  | 3/2004 | Oliver et al. ................ 345/440.2 |
| 6,906,717 | B2 |  | 6/2005 | Couckuyt et al. ............ 345/440 |
| 6,972,762 | B2 |  | 12/2005 | Ben-Tovim et al. .......... 345/440 |
| 7,084,872 | B2 |  | 8/2006 | Etgen et al. ................. 345/440 |
| 7,373,274 | B2 | * | 5/2008 | Kunce ......................... 702/179 |
| 2002/0154173 | A1 | | 10/2002 | Etgen et al. ................. 345/833 |
| 2004/0225648 | A1 | * | 11/2004 | Ransom et al. .................. 707/3 |
| 2005/0232055 | A1 | * | 10/2005 | Couckuyt et al. ............ 365/227 |
| 2006/0117271 | A1 | * | 6/2006 | Keim ........................... 715/789 |
| 2007/0038963 | A1 | * | 2/2007 | Moore ......................... 715/859 |
| 2007/0067211 | A1 | * | 3/2007 | Kaplan et al. .................. 705/10 |
| 2008/0103988 | A1 | * | 5/2008 | Harris et al. ................ 705/36 R |
| 2008/0127052 | A1 | * | 5/2008 | Rostoker ..................... 717/105 |
| 2008/0215496 | A1 | * | 9/2008 | Hockley et al. ............. 705/36 R |

OTHER PUBLICATIONS http://www.goldensoftware.com/products/grapher/grapher-overview.shtml.  
SYSTAT [online], [retrieved on Oct. 28, 2008]. Retrieved from the Internet: <URL:http://www.sigmaplot.com/products/SigmaPlot/> (copyright 2002) (6 pages).

* cited by examiner

*Primary Examiner* — Haoshian Shih  
(74) *Attorney, Agent, or Firm* — Merchant & Gould, P.C.

(57) ABSTRACT

Configuration of an interactive chart is performed by user interactions with a user interface in a satellite pane, which is distinct from a chart pane used to display the data fields present on an interactive chart. Upon entry of a configuration selection, a query is executed to retrieve data to be displayed by the interactive chart.

17 Claims, 7 Drawing Sheets

USER INTERFACE PANE FOR AN INTERACTIVE CHART

BACKGROUND

Interactive charts are available from numerous software vendors. One such example is known as the "PIVOTCHART" in the "EXCEL" spreadsheet program from Microsoft Corporation. Interactive charts enable users to dynamically interact with the data, from an underlying source, directly on the interactive chart. These interactive charts enable users to perform various analyses or act as summarization tools for very large data sets. Data for interactive charts can be within the software application or in an external relational or On Line Analytical Processing (OLAP) databases. In some cases, merely selecting one of these complex data sources and creating a chart automatically enables interactivity.

Once the data source is selected a user can then specify which data fields in the data source should be shown visually in the interactive chart. There are various interactions, such as operations and navigations, that can be performed once the data fields are selected. For example in one interaction, a user can manipulate the chart by drilling down into a particular field (viewing the children) or drilling up (viewing the parents). The user can also filter data to be excluded, such as specific ranges, data points, or other attribute of the data fields. These interactions take place without the need for reselecting the range of data fields.

Data selection and interaction with "PIVOTCHART" interactive charts are done through "drop zones." A user builds a chart by dragging and dropping one or more data items onto visual areas of the chart designated as drop zones. There are several drop zone on "EXCEL" "PIVOTCHARTs": Page Fields (data fields present for filtering chart data), Series Fields (fields present in the legend of the chart), Category Fields (fields present on the categorical X-axis) and Data Fields (numerical fields present in the plot area).

For example, dropping a date range onto the drop-zone located at the bottom center of a chart creates an interactive chart with the date range forming the x-axis of the chart. Drop-zones provide a level of intuitive interaction with interactive charts but often confuse users as to which drop-zone to use, visually clutter the resulting chart with data labels, and leave artifacts on the chart (e.g., "Drop Data Items Here"). These artifacts made interactive charts difficult to use and undesirable for use in presentations.

Known interactive charts have had limited acceptance by users who more often prefer static charts or other means to graphically display data. While the advantages of interactive charts as data analysis tools are well appreciated, the user interface has presented obstacles to acceptance.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A user interface for an interactive chart is presented in a satellite pane. The satellite pane is separate from the chart pane containing the interactive chart. Data fields selected to be present on the interactive chart may be interacted with through the satellite pane to perform data analysis and/or generate the final desired visual representation. In still further embodiments, the satellite pane is dockable to a display element, such as the chart pane or the application window. Embodiments of the present invention comprise systems, methods, user interface elements, and data structures that effectuate the embodiments of the interactive chart user interface.

DETAILED DESCRIPTION

Example embodiments will now be described more fully hereinafter with reference to the accompanying drawings. These embodiments are provided so that this disclosure will be thorough and complete. Like numbers refer to like elements throughout.

Figure 1:
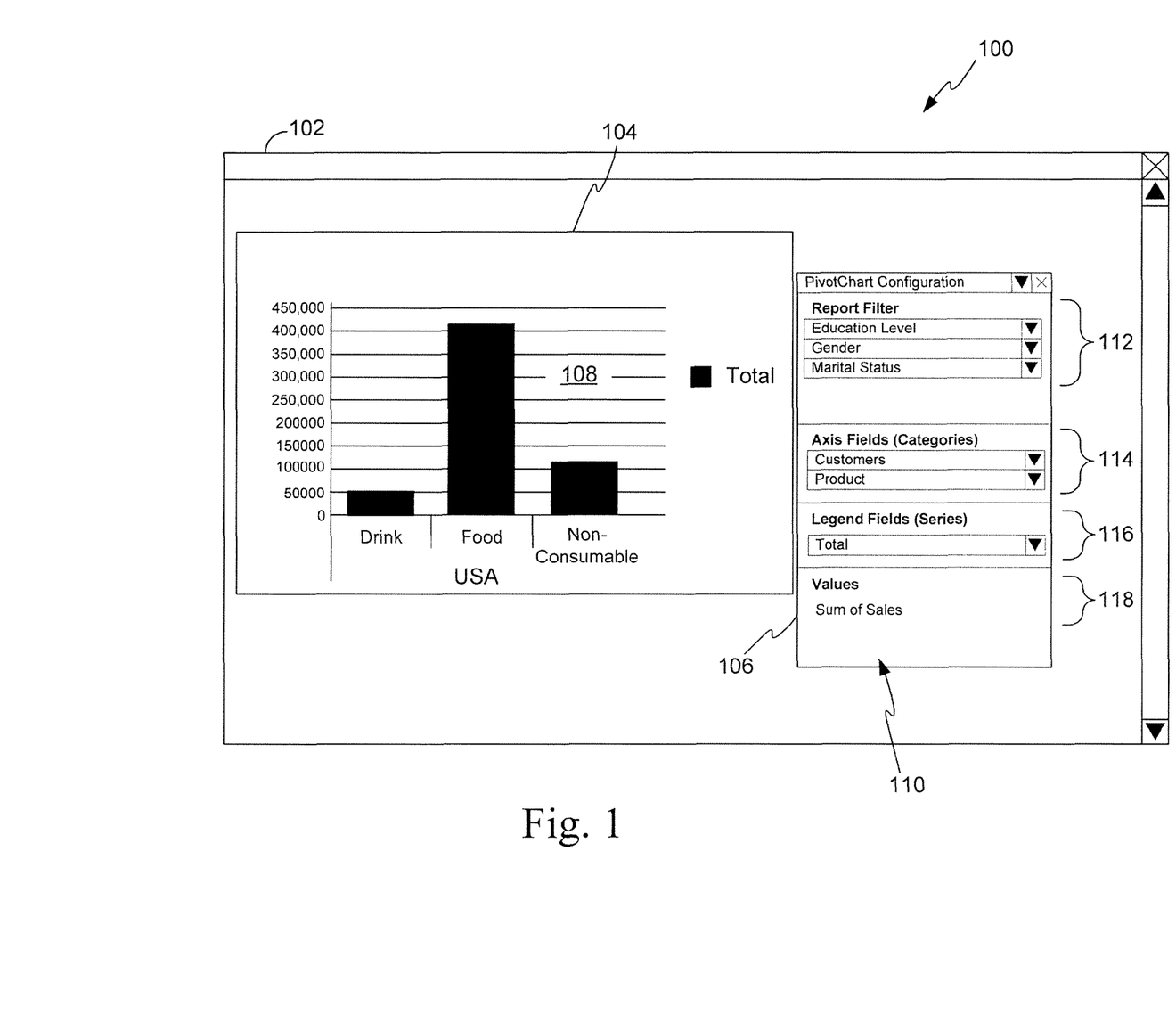
FIG. 1 illustrates an embodiment of a display window of a computer program including a chart pane and satellite pane.

FIG. 1 illustrates an embodiment of application display 100 with window 102 including chart pane 104 and satellite pane 106. Application display 100 executes on a computer system, such as computer 310 (see FIG. 3). Application display 100 is variously embodied and may include the display from a spreadsheet program, database program, or other program operable to graphically represent data items.

Interactive charts provide graphical representation of data, often the data is voluminous and located externally to the computer system. Interactive charts comprise a nearly infinite variety of styles. Chart styles are known in the art and, accordingly, are only briefly mentioned here. Charts styles include graphical charts, which are variously embodied and include, without limitation, two-dimensional, three-dimensional, bar, line, bubble, radar, pie, scatter, and other chart styles. Graphical charts may be combined with text to provide even more variations of chart styles. For example, a graphical chart may include textual labels. In another example, textual charts may include graphical elements such as lines, shading, color, fonts, as well as graphical elements within the cells of a table.

Window 102 provides chart pane 104 for presenting interactive chart 108, and satellite pane 106, with user interface 110, for configuring interactive chart 108. In one embodiment, a user configures interactive chart 108 with user interface 110. In response to entries to user interface 110 a query is created and executed on source data. The returned data, resulting from the query, is then displayed by interactive chart 108. In one embodiment, each input to user interface 110 causes a new query to be executed and displayed by interactive chart 108. In another embodiment, a user issues a number of inputs to user interface 110 and then causes a new query to be executed and displayed by interactive chart 108.

User interface 110 includes a number of data field selection areas: the report filter area 112, the axis fields area 114, the legend fields area 116 and the values area 118. The report filter area 112 holds data fields that are used to apply filters to the entire interactive chart 108. For instance, if a user wanted to filter all the data fields in interactive chart 108 to show only data items purchased by customers who are married, they would add marital status to the report filter area 112 and filter out unmarried customers. The axis field area 114 holds the data fields that are shown on the X-axis of interactive chart 108, for instance in FIG. 1 geographic location and product type are shown in the interactive chart 108. The legend fields area 114 shows the data series fields that comprise the legend for interactive chart 108. The values area 118 represent the quantitative (numeric) data fields from the data source and are shown on the plot area of interactive chart 108. Interacting with any of the areas 112, 114, 116, 118 in user interface 110 causes the data source to be queried to retrieve the data for representation by interactive chart 108.

The selection of a data field and where the data fields are selected (e.g., in area 112, 114, 116, or 118), determines how data will be represented by interactive chart 108. In one embodiment, axis selection area 114 receives a user's input determining the placement of data fields on interactive chart 108. For example, the data field added to axis field area 114 may comprise "product type." If the user also selects "sales" in value area 118, the bar of a bar chart would represent the sales amount for a particular product type. In another embodiment, legend selection area 116 receives user inputs determining the data field identifiers to be represented in the legend of interactive chart 108. In embodiments where combinations of filter selection area 112, axis selection area 114, and legend selection area 116 are in use, a filter applied to one field area 112, 114, and/or 116 impacts the other based on their association in the underlying data. For example, selecting a data field identifier in report filter selection area 112, for the purpose of filtering data, may add or remove data field identifiers available for selection for another purpose, such as for selection within axis selection area 114 and/or legend selection area 116.

In another embodiment, a selectability indicator provides an indicator as to whether or not a particular data field identifier may be selected for a given purpose. For example, selecting a data field identifier, for exclusion, in filter selection area 112 (i.e., a first purpose) would then update a selectability indicator in axis selection area 114 and/or legend selection area 116 (i.e., a second purpose). The first purpose may be a purpose that includes or excludes the data associated with the data field identifier from the resulting query used to retrieve the chart data. The second purpose may be a particular chart element (e.g., axis, legend, or point) of interactive chart 108. The selectability indicator is variously embodied and may include the presence or absence of a data field identifier in one or more data field selection areas, "graying out" or showing in full contrast a data selection indicator, an icon (e.g., checkmark, green traffic light, red traffic light, stop sign, or other appropriate graphic), or other indicator to convey that a particular data field indicator is, or is not, selectable.

It should be appreciated that variations in the type and method of selecting data field identifiers in data selection areas and/or usage selection areas are possible without departing from the disclosure herein. For example, user interface 110 may include an alternate usage selection area related to an associated alternate display aspect of interactive chart 108. In one embodiment, interactive chart 108 may be configured to represent data with color, z-axis, or other display attributes of an alternate usage. Therefore, user interface 110 may be configured with an associated data field selection area for the selection of data field identifiers associated with said display attributes. Alternate methods of selection include, without limitation, receiving user inputs in multi-select boxes, drop-down selection boxes, check boxes, radio buttons, and other graphical selection elements.

In one embodiment, satellite pane 106 provides user interface 110 for receiving a user's selection of the data utilized to configure interactive chart 108. In another embodiment, a number of satellite panes each provide a portion of user interface 110. A number of satellite panes may be utilized to allow one satellite pane to receive user input for one function (e.g., filter selection, data range selection, or axis selection). In still another embodiment, user interface 110 provides a user interface for selecting formatting options for interactive chart 108 (e.g., size, color, font).

Figure 2:
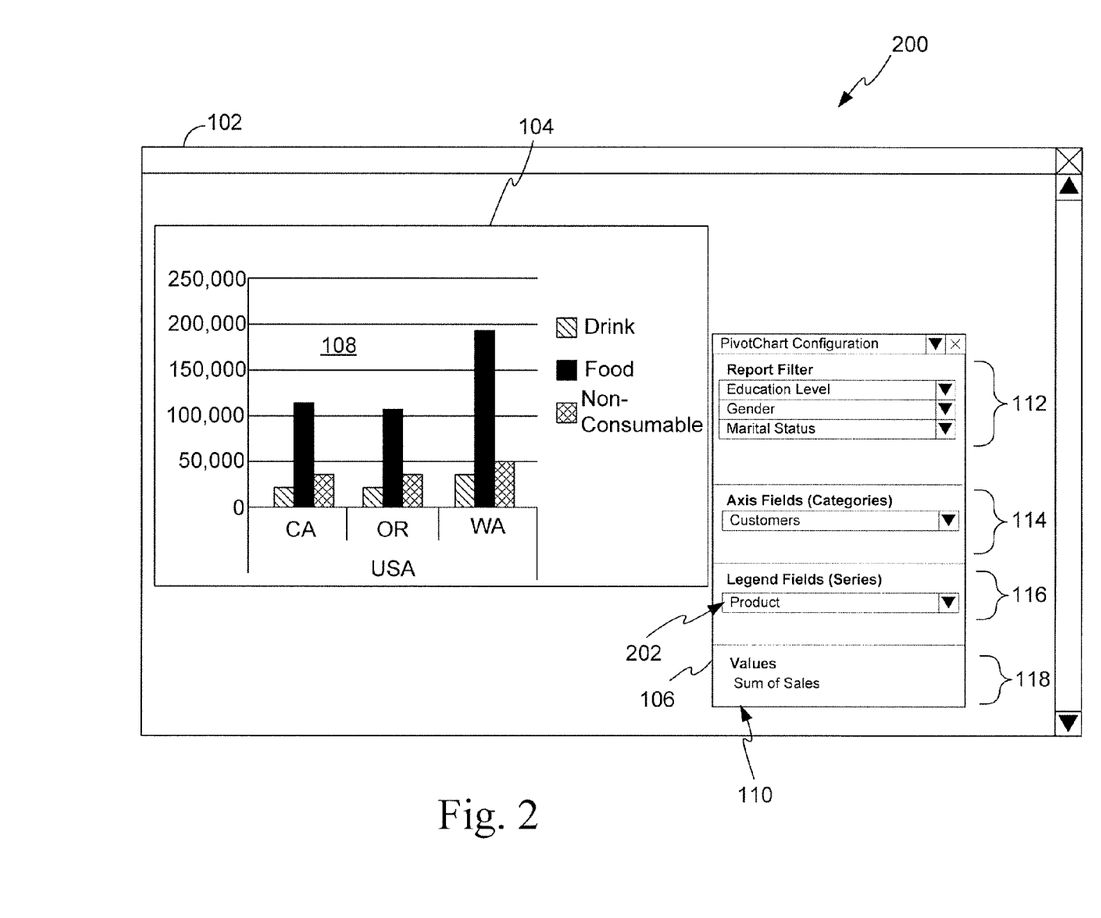
FIG. 2 illustrates an embodiment whereby an interactive chart is modified by user interactions with the satellite pane.

FIG. 2 illustrates an embodiment whereby interactive chart 108 is modified by user interactions with the satellite pane 106. The embodiment illustrated by FIG. 2 results from data field identifier 202 ("Product"), previously in axis selection area 114 (see FIG. 1) being moved to legend selection area 1116. In one embodiment, data field identifier 202 is moved by deletion from axis selection area 114 and added to legend selection area 116. In another embodiment, a user drags-and-drops data field identifier 202 to the desired data field selection area, such as legend selection area 116. In other embodiments, data field identifier 202 or other data field identifiers can be moved between any of the data field selection areas 112, 114, 116 by dragging and dropping. For instance the "Gender" data field identifier in report filter area 112 can be moved to axis field area 114. As a result of "gender" being removed from report filter area 112 and added to the axis field area 114, interactive chart 108 would reflect the change by adding a new category hierarchy to the X-axis. Data fields can also be removed from the selection areas. For example, a user can select a data field in legend field area 116 and drag the selected data field off of user interface 110. As a result, the data field would be removed from legend field area 116 and the interactive chart 108.

Figure 3:
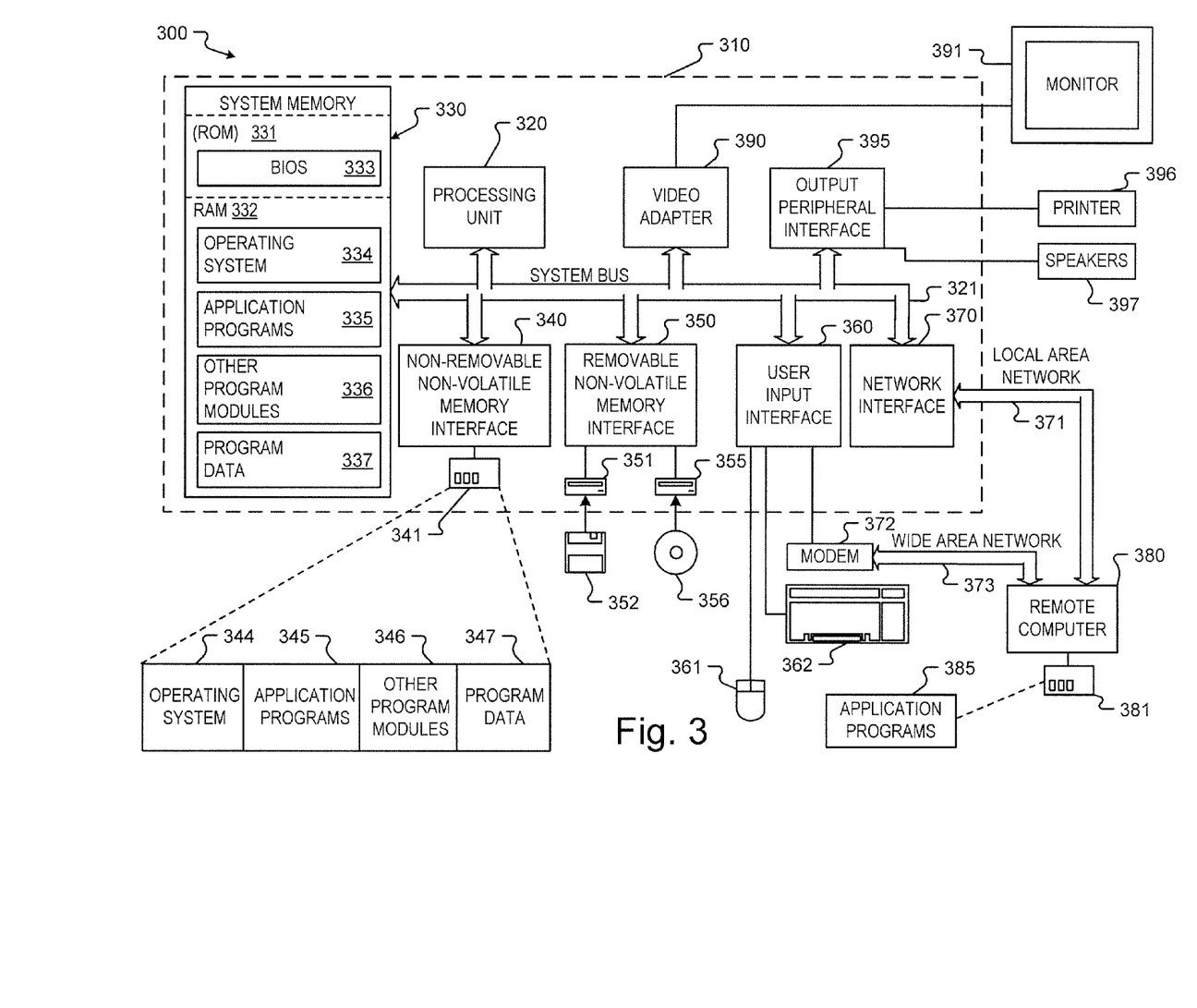
FIG. 3 illustrates a computing environment operable to implement embodiments described herein.

With reference to FIG. 3, an exemplary computer system 300 for implementing embodiments described herein. Components of the computer 310 may include, but are not limited to, a processing unit 320, a system memory 330, and a system bus 321 that couples various system components including the system memory 330 to the processing unit 320. The system bus 321 may be any of several types of bus structures including a memory bus or memory controller, a peripheral bus, or a local bus using any of a variety of bus architectures. By way of example, and not limitation, such architectures include the Industry Standard Architecture (ISA) bus, the Micro Channel Architecture (MCA) bus, the Enhanced ISA (EISA) bus, the Video Electronics Standards Association (VESA) local bus, and the Peripheral Component Interconnect (PCI) bus, also known as the Mezzanine bus.

Computer 310 typically includes a variety of computer readable media. Computer readable media can be any available media that can be accessed by the computer 310 and includes both volatile and nonvolatile media and removable and non-removable media. By way of example, and not limitation, computer readable media may comprise computer storage media and communication media. Computer storage media includes volatile, nonvolatile, removable, and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 310. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of the any of the above should also be included within the scope of computer readable media.

The system memory 330 includes computer storage media in the form of volatile and/or nonvolatile memory, such as read only memory (ROM) 331 and random access memory (RAM) 332. A basic input/output system 333 (BIOS), containing the basic routines that help to transfer information between elements within computer 310, such as during start-up, is typically stored in ROM 331. RAM 332 typically contains data and/or program modules that are immediately accessible to and/or presently being operated on by processing unit 320. By way of example, and not limitation, FIG. 3 illustrates operating system 334, application programs 335, other program modules 336, and program data 337. In one embodiment, application program, used to produce application display 100, is stored as a component of application programs 335 and data for display by interactive chart 108 is stored as a component of program data 337.

The computer 310 may also include other removable/non-removable, volatile/nonvolatile computer storage media. By way of example only, FIG. 3 illustrates a computer 310 with a non-removable, non-volatile memory interface 340 that reads from or writes to non-removable, nonvolatile magnetic media 341, such as a hard drive. Computer 310 may also include a non-volatile memory interface 350 that reads from or writes to a device 351, such as a disk drive, that reads from or writes to a removable, non-volatile media 352, such as a magnetic disk. In addition, the computer 310 may include an optical disk drive 355 that reads from or writes to a removable, nonvolatile optical disk 356, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 341 is typically connected to the system bus 321 through a non-removable memory interface, such as interface 340, and magnetic disk drive 351 and optical disk drive 355 are typically connected to the system bus 321 by a removable memory interface, such as interface 350.

The drives and their associated computer storage media discussed above and illustrated in FIG. 3, provide storage of computer readable instructions, data structures, program modules, and other data for the computer 310. For example, hard disk drive 341 is illustrated as storing operating system 344, application programs 345, other program modules 346, and program data 347, which can either be the same as or different from operating system 334, application programs 335, other program modules 336, and program data 337. Operating system 344, application programs 345, other program modules 346, and program data 347 are given different numbers here to illustrate that, at a minimum, they are different copies. A user may enter commands and information into the computer 310 through a user input interface 360 connected to user input devices, such as a keyboard 362 and pointing device 361, commonly referred to as a mouse, trackball, or touch pad. Commands into computer 310 may be presented to a user as inputs to a display element, such as user interface 110. Other input devices (not shown) may include a microphone, joystick, game pad, satellite dish, scanner, or the like. These and other input devices are often connected to the processing unit 320 through a user input interface 360 that is coupled to the system bus 321, but may be connected by other interfaces and bus structures, such as a parallel port, game port, or a universal serial bus (USB).

A monitor 391 or other type of display device is also connected to the system bus 321 via an interface, such as a video interface 390. In one embodiment, monitor 391 operates as monitor 600 (see FIG. 6) to display interactive chart 108 and user interface 110. In addition to the monitor 391, the computer 310 may also include other peripheral output devices such as speakers 397 and printer 396, which may be connected through an output peripheral interface 395.

The computer 310 may operate in a networked environment using logical connections to one or more remote computers, such as a remote computer 380. Remote computer 380 may hold data available for display by chart pane 104 or access the data externally located to remote computer 380, such as in remote memory storage device 381. The remote computer 380 may be a personal computer, a server, a router, a network PC, a peer device, or other common network node, and typically includes many or all of the elements described above relative to the computer 310, although only a memory storage device 381 has been illustrated in FIG. 3. The logical connections depicted in FIG. 3 include a local area network (LAN) 371 and a wide area network (WAN) 373, but may also include other networks, such as wireless networks. Such networking environments are commonplace in offices, enterprise-wide computer networks, intranets, and the Internet.

When used in a LAN networking environment, the computer 310 is connected to the LAN 371 through a network interface or adapter 370. When used in a WAN networking environment, the computer 310 typically includes a modem 372 or other means for establishing communications over the WAN 373, such as the Internet. The modem 372, which may be internal or external, may be connected to the system bus 321 via the user input interface 360, or other appropriate mechanism. In a networked environment, program modules depicted relative to the computer 310, or portions thereof, may be stored in the remote memory storage device 381. By way of example, and not limitation, the remote application programs 385 reside on memory device 381. It will be appreciated that the network connections shown are exemplary and other means of establishing a communications link between the computers may be used.

Figure 4:
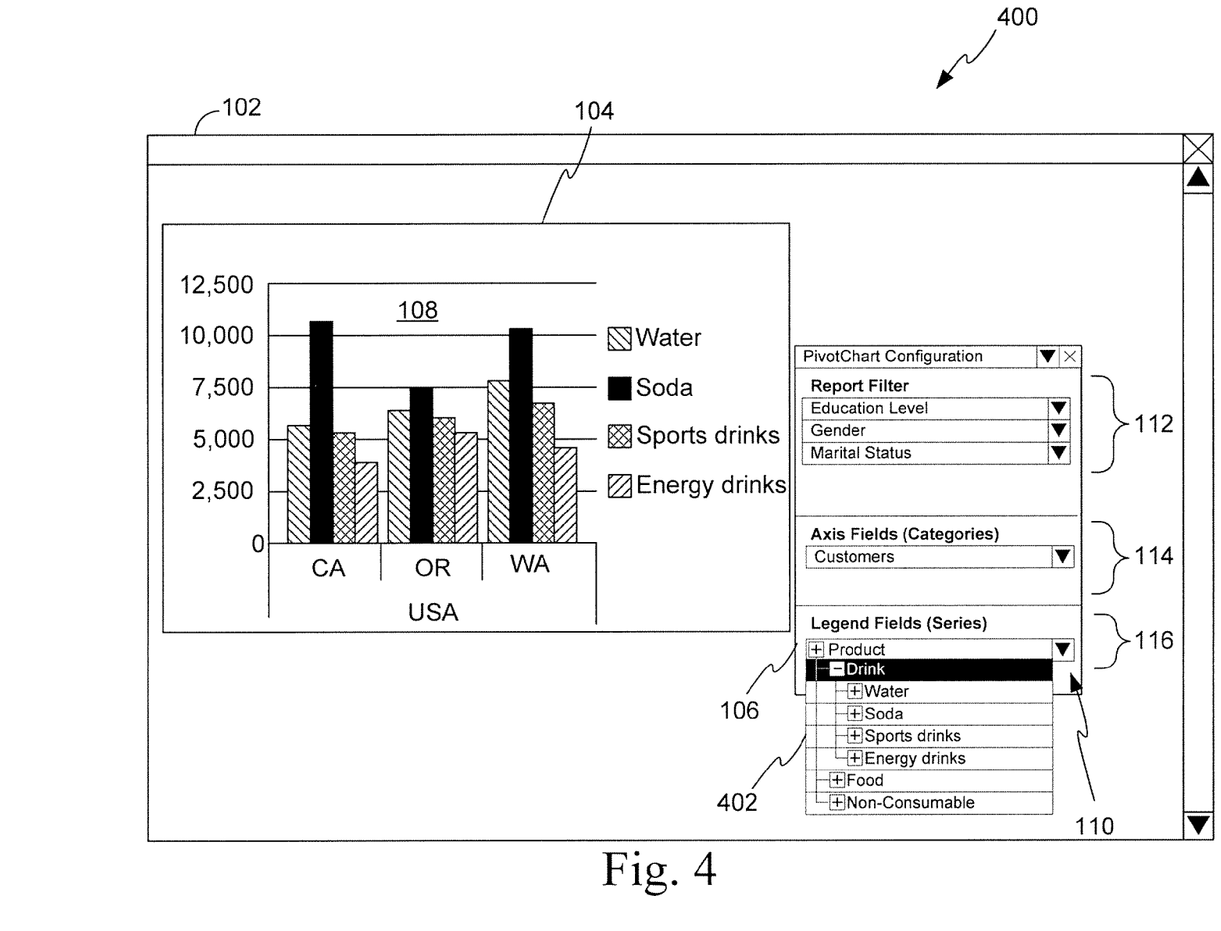
FIG. 4 illustrates "drilling-down" into the data displayed by an interactive chart.

FIG. 4 illustrates "drilling-down" into the data displayed by interactive chart 108. One benefit provided by interactive chart 108 relates to the ease with which data utilized to produce interactive chart 108 may be altered by the user. In one embodiment, a user may "drill-down" (view the children data elements) into the displayed data and cause interactive chart 108 to update with details for a particular chart element. In a specific embodiment, a user is presented with interactive chart 108 displaying products sold in the Northwest (see FIG. 1). The user selects the more detailed data field identifier (e.g., "drink") in legend selection area 116, such with an input to drop down list box 402. Accordingly, interactive chart 108 is updated to reflect the selection of the new data field identifier.

In another embodiment, satellite pane 106 is dockable to a display element. Two or more display elements may be docked, with respect to each other, for user interaction. Docking allows separate display elements to operate as if they were a single display element for at least one purpose, such as placement. Placement operations, such as move, minimize, open, and close allow a user to interact with all mutually docked display elements with interaction inputs to one of the mutually docked display elements. Docked elements are generally displayed so as to appear attached to each other. While not required, displaying the elements as attached to each other is one method to convey to a user that the items are docked, although other means of indicating docking may also be utilized, such as common colors, common font, visual links, placement in a workspace, or other appropriate indicators.

Figure 5:
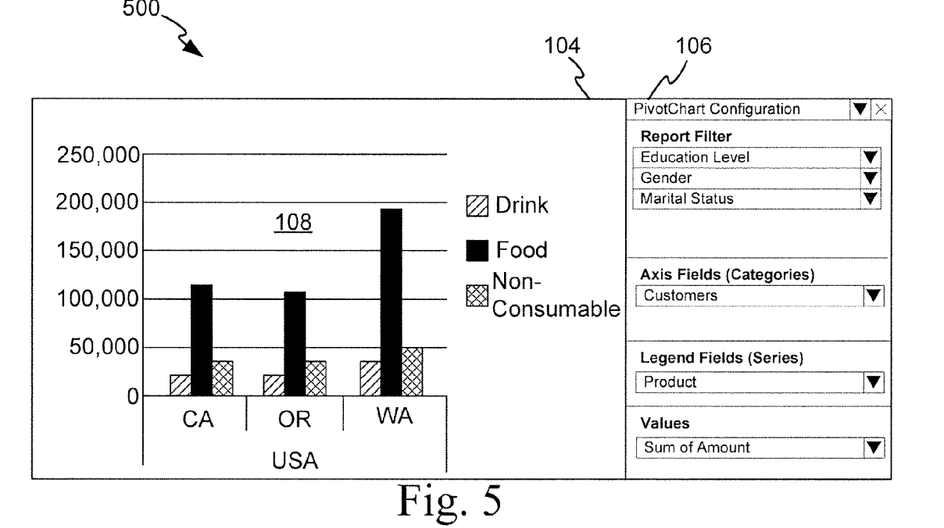
FIG. 5 and FIG. 6 illustrate docking the satellite pane to a display element.
Figure 6:
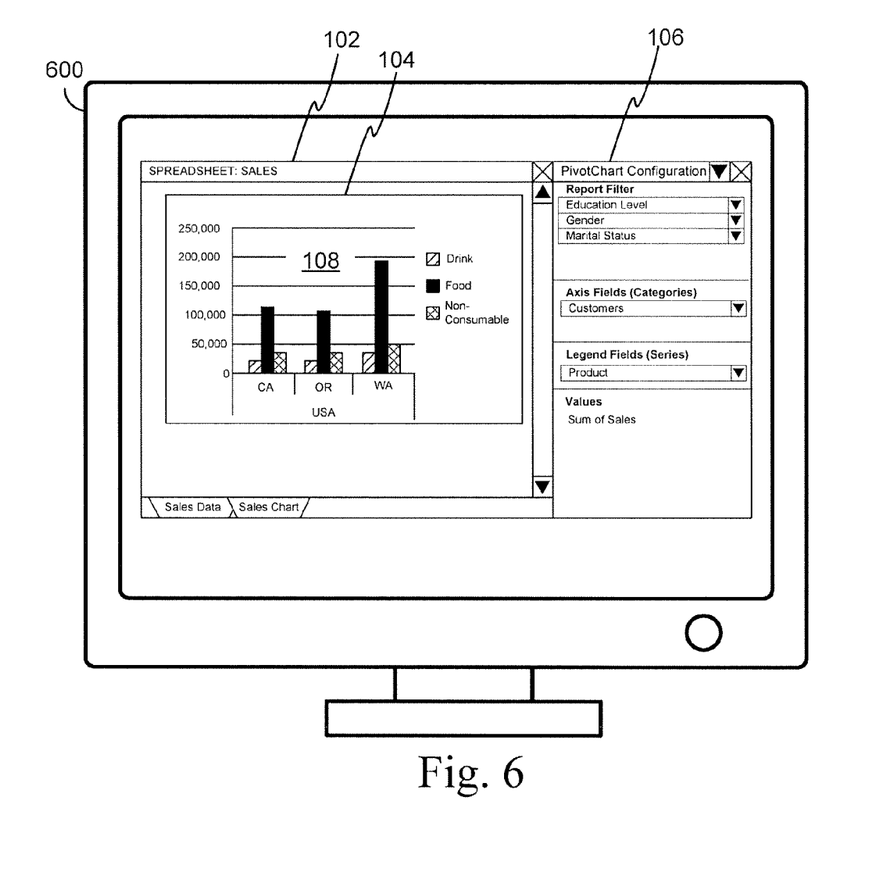

The display elements may include, for example, interactive chart 108, chart pane 104, and/or display window 102. With reference to FIG. 5, combined pane 500 illustrates satellite pane 106 docked to chart pane 104. With reference to FIG. 6, monitor 600 displays the output of a computer, such as when operating as monitor 391 (see FIG. 3). A computer application, such as application 100, displays window 102. Satellite pane 106 may then be docked to display window 102. A user can manage their workspace by selectively docking satellite pane 106 to chart pane 104, display window 102, interactive chart 108, or other display element. Alternatively, the user can opt to keep satellite pane 106 undocked. Docking satellite pane 106 to a display element, causes satellite pane 106 to be subject to positioning operations (e.g., move, sized, opened, closed, hidden or shown) of the display element and/or vice versa. For example, moving or minimizing chart pane 104 in FIG. 5 would similarly move or minimize satellite pane 106. In yet another embodiment, satellite pane 106 is hidden and becomes visible when the user indicates a desire to interact with interactive chart 108 or chart pane 104. The user indication includes clicking, mouse-over, tabbing to, executing an explicit instruction to show satellite pane 106, or other action consistent with a need to have satellite pane 106 become visible.

Figure 7:
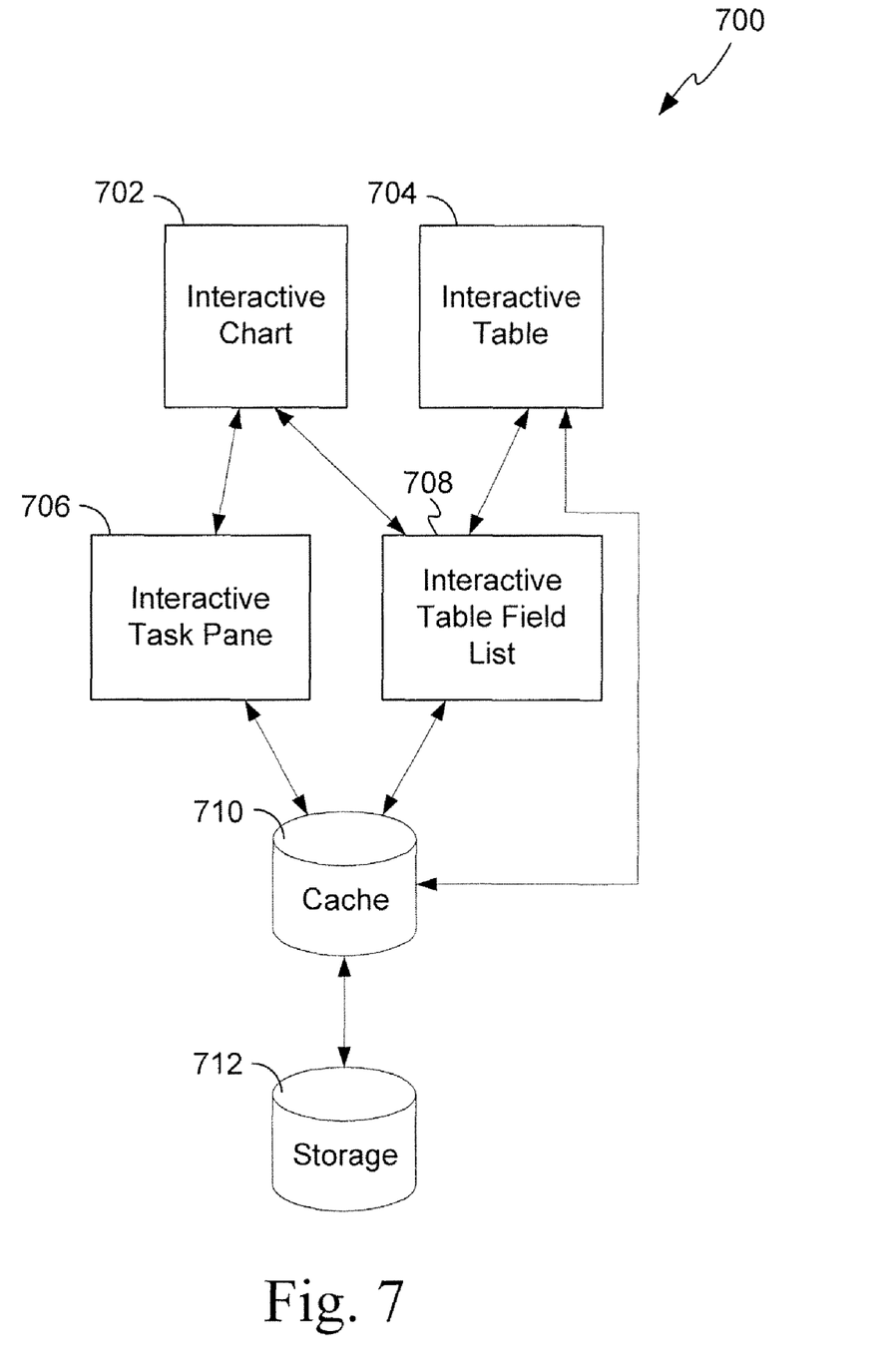
FIG. 7 illustrates an interaction diagram in which an interactive chart is implemented.

With reference to FIG. 7, interaction diagram 700 illustrates one embodiment in which interactive chart module 702 is implemented. In one embodiment, chart module 702 provides machine instructions for interactive chart 108. Interactive charts may have an associated interactive table module 704, which is optionally displayed to a user, such as by application display 100. Interactive table module 704 optionally provides a tabular representation of the data represented by interactive chart module 702. Source data is stored in storage module 712. Storage module 712 may be local or remote to the machine displaying interactive chart module 702 and optionally, interactive table module 704. Cache module 710 is optionally implemented to improve performance by allowing source data to be more accessible, such as when storage module 712 is remote storage or storage module 712 is not as responsive as cache module 710.

Interactive task pane module 706 receives user input and may be visually represented in a display element, such as by satellite pane 106. In one embodiment, interactive task pane module 706 provides machine instructions for user interface 110. Interactive task pane module 706 and interactive table field list module 708 perform queries on cache module 710 to determine which field identifiers are active and in what region. For example, a user may input a command to interactive task pane 706 that indicates the interactive chart module 702 is to swap X and Y axes. Such a command alters the chart displayed by interactive chart module 702, although the query of the source data in cache module 710 and/or storage module 712 may be unaffected. The interactive task pane module 706 provides for the proper presentation of the data. However, in other embodiments (such as where an improvement in performance is desired), the query would be modified and the interactive task pane module 706 would display the chart data accordingly while providing any additional formatting requirements. In order for interactive chart module 702 to display the data correctly, interactive task pane module 706 formats the results of the query in accord with such a change in axis. Similarly, such a change may be input to interactive table field list module 708 affecting the chart displayed by interactive chart module 702 and/or the table displayed by interactive table module 704.

In embodiments simultaneously implementing interactive chart module 702 and interactive table module 704, allow an update to one to results in updates to both. In one such embodiment a change occurs which affects the content of cache module 710 which then propagates to one or both of interactive chart module 702 and interactive table module 704. Alternatively, cache module 710 may directly update interactive table module 704.

Figure 8:
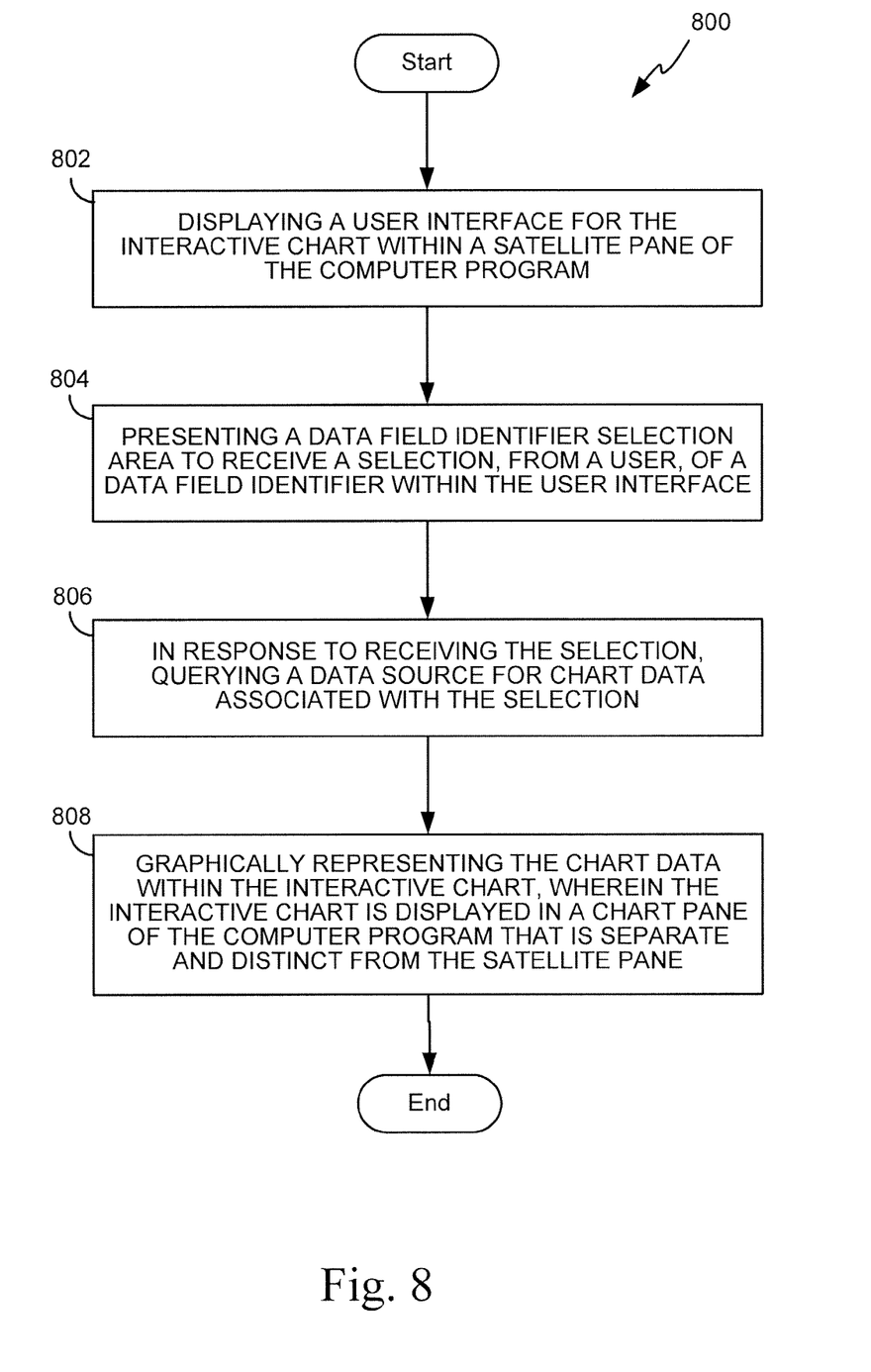
FIG. 8 illustrates a flowchart for configuring an interactive chart with a user interface in satellite pane.

FIG. 8 illustrates flowchart 800 for configuring a chart pane with a user interface in satellite pane. In one embodiment, step 802 displays a user interface for an interactive chart. The user interface is displayed in a satellite pane rather than in the chart pane displaying the interactive chart. Step 804 presents data field identifiers for selection. Step 806 receives the selection and creates a query of source data in accord with the selection. Step 808 graphically displays the chart data within the interactive chart. After step 808, flowchart may optionally terminate or process additional steps.

One additional step includes receiving a data field identifier for a first purpose and then indicating the availability of the selected data field identifier for a second purpose. Another additional step is docking the satellite pane to another display element, such as the chart pane, in response to an input from a user. Further additional steps may be performed as a matter of design choice.

Although the subject matter has been described in language specific to structural features and/or methodological acts, it is to be understood that the subject matter defined in the appended claims is not necessarily limited to the specific features or acts described above. Rather, the specific features and acts described above are disclosed as examples forms of implementing the claims.

What is claimed:

1. A computer-implemented method of configuring an interactive chart displayed by a computer program, comprising:
    displaying a user interface for the interactive chart within a satellite pane of the computer program, wherein the interactive chart is displayed in a chart pane of the computer program, and wherein the chart pane is separate and distinct from the satellite pane;
    presenting a plurality of data field selection areas in the user interface within the satellite pane, wherein the plurality of data field selection areas comprises two or more from the group consisting of filter selection area, axis selection area, legend selection area, and values selection area, and wherein each data field selection area holds at least one data field identifier available for selection by a user for modifying the interactive chart;
    in response to moving a first data field identifier in a first data field selection area to a second data field selection area, updating the first data field selection area to such that the first data field identifier is not available for selection and updating the second data field selection area to indicate the availability of the first data field identifier for selection in the second data field selection area;

in response to receiving a selection of a particular data field identifier in a particular data field selection area, querying a data source for chart data associated with the selection; and graphically representing the chart data within the interactive chart displayed in the chart pane, wherein the selected particular data field identifier and the particular data field selection area determine how the chart data is graphically represented in the interactive chart.

2. The method of claim 1, wherein the selection of the data field identifier is in the filter selection area, and wherein the selected data field identifier in the filter selection area applies a first filter to the interactive chart.

3. The method of claim 1, wherein the axis selection area holds a data field identifier on an X-axis of the interactive chart.

4. The method of claim 1, wherein a combination of filter selection area and legend selection area is used.

5. The method of claim 1, further comprising docking the satellite pane to a display element of the computer program.

6. The method of claim 1, further comprising, activating the satellite pane upon receiving a user interaction with the chart pane.

7. A computer-readable storage medium storing computer-executable instructions for performing steps comprising:

displaying a user interface in a satellite pane, wherein the satellite pane does not consist of a drop zone, wherein the user interface is used to configure an interactive chart presented in a chart pane, and wherein the chart pane is separate and distinct from the satellite pane;

presenting a plurality of data field selection areas in the user interface within the satellite pane, wherein the plurality of data field selection areas comprises two or more from the group consisting of filter selection area, axis selection area, legend selection area, and values selection area, and wherein each data field selection area holds at least one data field identifier available for selection by a user for modifying the interactive chart;

in response to receiving a selection of a first data field identifier in a first data field selection area for a first purpose, querying a data source for chart data associated with the selection and updating a selectability indicator of at least a second data field identifier for a second purpose to indicate availability of the second data field identifier for selection for the second purpose; and graphically representing the chart data within the interactive chart displayed in the chart pane, wherein at least the first selected data field identifier and the plurality of data field selection areas determine how the chart data is graphically represented on the interactive chart.

8. The computer-readable storage medium of claim 7, wherein the selection of the first data field identifier is in the filter selection area, and wherein the selected first data field identifier in the filter selection area applies a first filter to the interactive chart.

9. A computer system, comprising:
a processor operable to cause the computer system to retrieve a set of data field identifiers from a data source;
a display device to present a graphical user interface with a plurality of data field selection areas in a satellite pane of the display device, wherein the satellite pane does not consist of a drop zone, and wherein the plurality of data field selection areas in the satellite pane comprises two or more from the group consisting of filter selection area, axis selection area, legend selection area, and values selection area;
an input device to receive a selection of a first data field identifier in a first data field selection area for a first purpose; and
a processing unit to:
in response to the selection, compose and execute a query upon the data source for chart data associated with the selected data field identifier and update a selectability indicator of at least a second data field identifier for a second purpose to indicate availability of the second data field identifier for selection for the second purpose; and
cause the display device to present an interactive chart in a chart pane distinct from the satellite pane, wherein the interactive chart graphically represents the chart data, and wherein the selected first data field identifier and the plurality of data field selection areas determine how the chart data is graphically represented on the interactive chart.

10. The computer system of claim 9, wherein:
the input device is operable to receive the selection of a data field identifier in a particular data field selection area through a method of selection comprising one or more from the group consisting of multi-select boxes, drop-down selection boxes, check boxes, and radio buttons.

11. The computer system of claim 9, wherein the display device presents the satellite pane docked to the chart pane, wherein positioning operations upon the chart pane similarly affect the satellite pane.

12. The method of claim 1, wherein the selectability indicator is an icon.

13. The method of claim 1, wherein a first data field identifier in a first data field selection area is moved to a second data field selection area.

14. The computer-readable storage medium of claim 7, further comprising docking the satellite pane to a display element.

15. The computer system of claim 7, wherein the selectability indicator is an icon.

16. The computer-readable storage medium of claim 7, wherein a first data field identifier in a first data field selection area is moved to a second data field selection area.

17. The computer system of claim 9, wherein a first data field identifier in a first data field selection area is moved to a second data field selection area.

* * * * *